(12) United States Patent
Murata et al.

(10) Patent No.: US 8,273,422 B2
(45) Date of Patent: Sep. 25, 2012

(54) LIQUID CRYSTAL DISPLAY

(75) Inventors: Satoshi Murata, Tottori (JP); Shota Makimoto, Tottori (JP); Norio Sugiura, Miyagi (JP); Kengo Kanii, Kumamoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 1110 days.

(21) Appl. No.: 11/345,659

(22) Filed: Feb. 2, 2006
(Under 37 CFR 1.47)

(65) Prior Publication Data
US 2007/0026164 A1    Feb. 1, 2007

(30) Foreign Application Priority Data

Feb. 4, 2005    (JP) ................. 2005-028876

(51) Int. Cl.
*C09K 19/00*    (2006.01)
*C09K 19/52*    (2006.01)
*G02F 1/13*    (2006.01)
*G02F 1/1333*    (2006.01)
*G02F 1/1337*    (2006.01)

(52) U.S. Cl. ............. 428/1.3; 428/1.1; 349/1; 349/56; 349/123; 252/299.01

(58) Field of Classification Search .......... 430/20; 428/1.1, 1.3; 252/299.01, 299.1, 299.6; 349/1, 349/56, 123
See application file for complete search history.

(56) References Cited

U.S. PATENT DOCUMENTS

| | | | |
|---|---|---|---|
| 5,737,051 A | 4/1998 | Kondo et al. | |
| 6,466,296 B1 * | 10/2002 | Yamada et al. | 349/160 |
| 6,525,797 B2 * | 2/2003 | Tsuda et al. | 349/139 |
| 6,630,969 B2 * | 10/2003 | Kubota et al. | 349/89 |
| 7,142,259 B2 * | 11/2006 | Hattori et al. | 349/33 |
| 2003/0043336 A1 | 3/2003 | Sasaki et al. | |
| 2007/0026164 A1 * | 2/2007 | Murata et al. | 428/1.1 |

FOREIGN PATENT DOCUMENTS

| | | |
|---|---|---|
| JP | 2000-221510 | 8/2000 |
| JP | 2002-287153 A | 10/2002 |
| JP | 2002-323701 | 11/2002 |
| JP | 2003-149647 | 5/2003 |

* cited by examiner

*Primary Examiner* — Geraldina Visconti
(74) *Attorney, Agent, or Firm* — Nixon & Vanderhye P.C.

(57) ABSTRACT

The invention relates to a liquid crystal display used as a display unit of an electronic apparatus and provides a liquid crystal display which can achieve high display quality. The liquid crystal display includes a pair of substrates provided opposite to each other, a liquid crystal having negative dielectric constant anisotropy sealed between the substrates, an alignment film formed on each of surfaces of the substrates facing each other for vertically aligning the liquid crystal, the film being formed using a material including an epoxy type cross linking agent at a concentration in the range from 0% by weight to 0.01% by weight inclusive, and a polymer layer for regulating the direction of alignment of the liquid crystal formed in the vicinity of an interface between the liquid crystal and the alignment film as a result of polymerization of a polymeric component included in the liquid crystal.

6 Claims, 3 Drawing Sheets

LIQUID CRYSTAL DISPLAY

BACKGROUND OF THE INVENTION

1. Field of the Invention

The present invention relates to a liquid crystal display used such as a display unit of an electronic apparatus.

2. Description of the Related Art

Recently, liquid crystal displays are used as monitors of television receivers and personal computers. In such applications, a display is required to have a wide viewing angle so that the display screen can be viewed in all directions. MVA (Multi-domain Vertical Alignment) liquid crystal displays are known as liquid crystal displays which can provide a wide viewing angle. An MVA liquid crystal display includes a liquid crystal having negative dielectric constant anisotropy sealed between a pair of substrates, vertical alignment films for aligning liquid crystal molecules substantially perpendicularly to surfaces of the substrates, and alignment regulating structures for regulating the direction of alignment of the liquid crystal molecules. Linear protrusions and blanks (main slits) in electrodes are used as the alignment regulating structures. When a voltage is applied, liquid crystal molecules are tilted in directions perpendicular to directions in which the alignment regulating structures extend. The alignment regulating structures are used to provide a plurality of regions which are different from each other in the aligning direction of liquid crystal molecules in each pixel, whereby a wide viewing angle is achieved.

In the case of an MVA liquid crystal display, however, since linear protrusions or main slits having a relatively great width are provided in pixel regions, the aperture ratio of the pixels becomes smaller than that in a TN mode liquid crystal display having no alignment regulating structure, which results in a problem in that high light transmittance cannot be achieved.

In order to solve the above-described problem, some MVA liquid crystal displays are provided with pixel electrodes having a cross-shaped electrode extending in parallel with or perpendicularly to bus lines, a plurality of stripe-shaped electrodes obliquely branching from the cross-shaped electrodes and extending in four orthogonal directions, and fine slits formed between stripe-shaped electrodes adjacent to each other. When a voltage is applied, liquid crystal molecules are tilted by oblique electric fields generated at edges of the pixel electrodes in directions in parallel with directions in which the fine slits extend. In the case of such an MVA liquid crystal display, any reduction in the aperture ratio can be suppressed because there is no linear protrusion or main slit having a great width in pixel regions. However, since an alignment regulating force provided by stripe-shaped electrodes and fine slits is weaker than an alignment regulating force provided by linear protrusions or main slits, a problem arises in that the liquid crystal will have a long response time and in that alignment is liable to disturbance attributable to a press with a finger.

Under the circumstance, liquid crystal displays having the above-described pixel configuration employ a polymer sustained alignment (PSA) technique for memorizing tilting directions of liquid crystal molecules by mixing an optically or thermally polymerizable monomer in the liquid crystal in advance and polymerizing the monomer while the liquid crystal molecules are tilted by a voltage applied thereto (see Patent Document 1 for example). In a liquid crystal display employing the PSA technique, since polymeric films which memorize tilting directions of liquid crystal molecules are formed at interfaces between the liquid crystal and alignment films, a high alignment regulating force can be obtained. Thus, the liquid crystal has a short response time, and liquid crystal molecules can be reliably tilted in directions in parallel with directions in which fine slits extend. It is therefore possible to provide an MVA liquid crystal display which is less liable to disturbance of liquid crystal alignment even when pressed by a finger.

Patent Document 1: JP-A-2003-149647
Patent Document 2: JP-A-2000-221510
Patent Document 3: JP-A-2002-323701

However, display irregularities are sometimes visually perceived on the display screens of liquid crystal displays employing the PSA technique. In the case of a liquid crystal display which has filled with a liquid crystal using the dip type vacuum filling method, a display irregularity is visually perceived, for example, in the vicinity of a side of the device opposite to a liquid crystal filling hole. In the case of a liquid crystal display fabricated using the one drop filling (ODF) method, a display irregularity is visually perceived, for example, in a position where liquid crystal droplets dispensed in adjacent regions on the substrate come into contact with each other after being spread. For example, when liquid crystal droplets are dispensed in the form of a matrix on a substrate, grid-like display irregularities are visually perceived. As thus described, a liquid crystal display employing the PSA technique has a problem in that it cannot achieve high display quality because it has display irregularities which can be easily perceived. In particular, the problem is more significant in a liquid crystal display fabricated using the ODF method than in a liquid crystal display fabricated using the vacuum filling method.

SUMMARY OF THE INVENTION

It is an object of the invention to provide a liquid crystal display which can achieve high display quality.

The above-described object is achieved by a liquid crystal display characterized in that it includes a pair of substrates provided opposite to each other, a liquid crystal having negative dielectric constant anisotropy sealed between the pair of substrates, an alignment film formed on each of surfaces of the pair of substrates facing each other for vertically aligning the liquid crystal, the film being formed using a material including an epoxy type cross linking agent at a concentration in the range from 0% by weight to 0.01% by weight inclusive, and a polymer layer for regulating the direction of alignment of the liquid crystal formed in the vicinity of an interface between the liquid crystal and the alignment film as a result of polymerization of a polymeric component included in the liquid crystal.

The invention makes it possible to provide a liquid crystal display which can achieve high display quality.

DESCRIPTION OF THE PREFERRED EMBODIMENT

Figure 1:
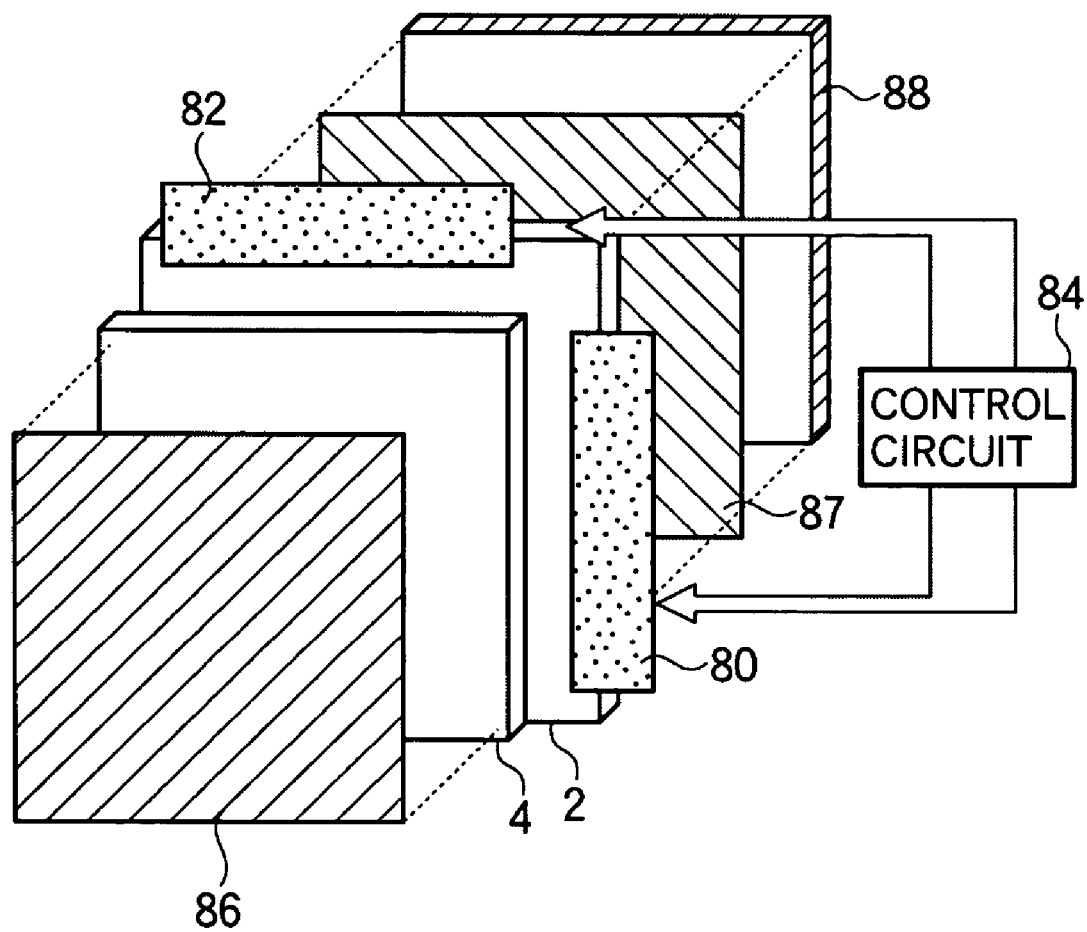
FIG. 1 shows a schematic configuration of a liquid crystal display in a mode for carrying out the invention.

A liquid crystal display in a mode for carrying out the invention will now be described with reference to FIGS. 1 to 3. First, the principle of the present mode for carrying out the invention will now be described. Display irregularities visually perceived on the display screen of a liquid crystal display according to the related art employing the PSA technique are generated by a difference of light transmittance in some regions of the display from light transmittance in other regions of the same. For example, in the case of a liquid crystal display fabricated using the ODF method, light transmittance in regions where liquid crystal droplets come into contact with each other after being dispensed and spread is different from light transmittance in other regions. This is assumed to be attributable to the fact that the polymerization of a monomer is highly likely to occur in the regions where liquid crystal droplets come into contact with each other after being spread. Possible factors which encourage polymerization in those regions include the fact that foreign substances on substrate surfaces gather in those regions when the liquid crystal is spread and the foreign substances serve as nuclei of polymerization of the monomer. It has been found that foreign substances which are difficult to eliminate before dispensing a liquid crystal include an epoxy type cross linking agent deposited on the surface of alignment films. In general, an epoxy type cross linking agent is included in alignment films to improve the adhesion of the films to an ITO. Further, the inclusion of an epoxy type cross linking agent in alignment films improves the voltage holding capacity of the alignment films and suppresses the generation of a residual DC voltage attributable to charging of the alignment films, thereby improving the electrical characteristics of the alignment films. The inclusion of an epoxy type cross linking agent also improves the water resisting property of alignment films which has relatively high importance for a liquid crystal display fabricated using the ODF method involving dispensing of a liquid crystal under the atmospheric pressure.

In the present mode for carrying out the invention, alignment films are formed using a material (e.g., polyamic acid or polyimide) including an epoxy type cross linking agent at a relatively low concentration (in the range from 0% by weight to 0.01% by weight inclusive). The deposition of the epoxy type cross linking agent which can serve as a nucleus of polymerization is thus restrained to suppress display irregularities on a liquid crystal display utilizing the PSA technique. The effect of suppressing display irregularities is higher, the lower the concentration of the epoxy type cross linking agent. It is therefore desirable to use a material including no epoxy type cross linking agent at all (the concentration of the agent is 0% by weight). In the present mode for carrying out the invention, in addition to the suppression of display irregularities as described above, the electric characteristics and water resisting property of alignment films are improved by keeping the rate of imidization of the alignment films at 50% or higher.

A configuration of a liquid crystal display in the present mode for carrying out the invention will now be described. FIG. 1 shows a schematic configuration of a liquid crystal display in the present mode for carrying out the invention. As shown in FIG. 1, the liquid crystal display includes a TFT substrate 2 having gate bus lines and drain bus lines formed across each other with an insulation film interposed between them and a thin film transistor (TFT) and a pixel electrode formed at each pixel. The liquid crystal display also includes an opposite substrate 4 formed with color filters (CF) and a common electrode and provided opposite to the TFT substrate 2 and alignment films formed on surfaces of the substrates 2 and 4 facing each other. The substrates 2 and 4 are combined through a sealing material which is continuously formed along the entire peripheries of the surfaces thereof facing each other. A vertically aligned liquid crystal having negative dielectric constant anisotropy is sealed between the substrates 2 and 4.

The TFT substrate 2 is connected to a gate bus line driving circuit 80 loaded with a driver IC for driving a plurality of gate bus lines and a drain bus line driving circuit 82 loaded with a driver IC for driving a plurality of drain bus lines. The driving circuits 80 and 82 output scan signals and data signals to predetermined gate bus lines and drain bus lines based on predetermined signals output by a control circuit 84. A polarizer 87 is provided on a surface of the TFT substrate 2 opposite to the surface thereof on which the TFT elements are formed, and a polarizer 86 is provided on a surface of the opposite substrate 4 opposite to the surface thereof on which the common electrode is formed, the polarizer 86 being in a crossed Nicols relationship with the polarizer 87. A backlight unit 88 is provided on a surface of the polarizer 87 opposite to the surface thereof facing the TFT substrate 2.

Figure 2:
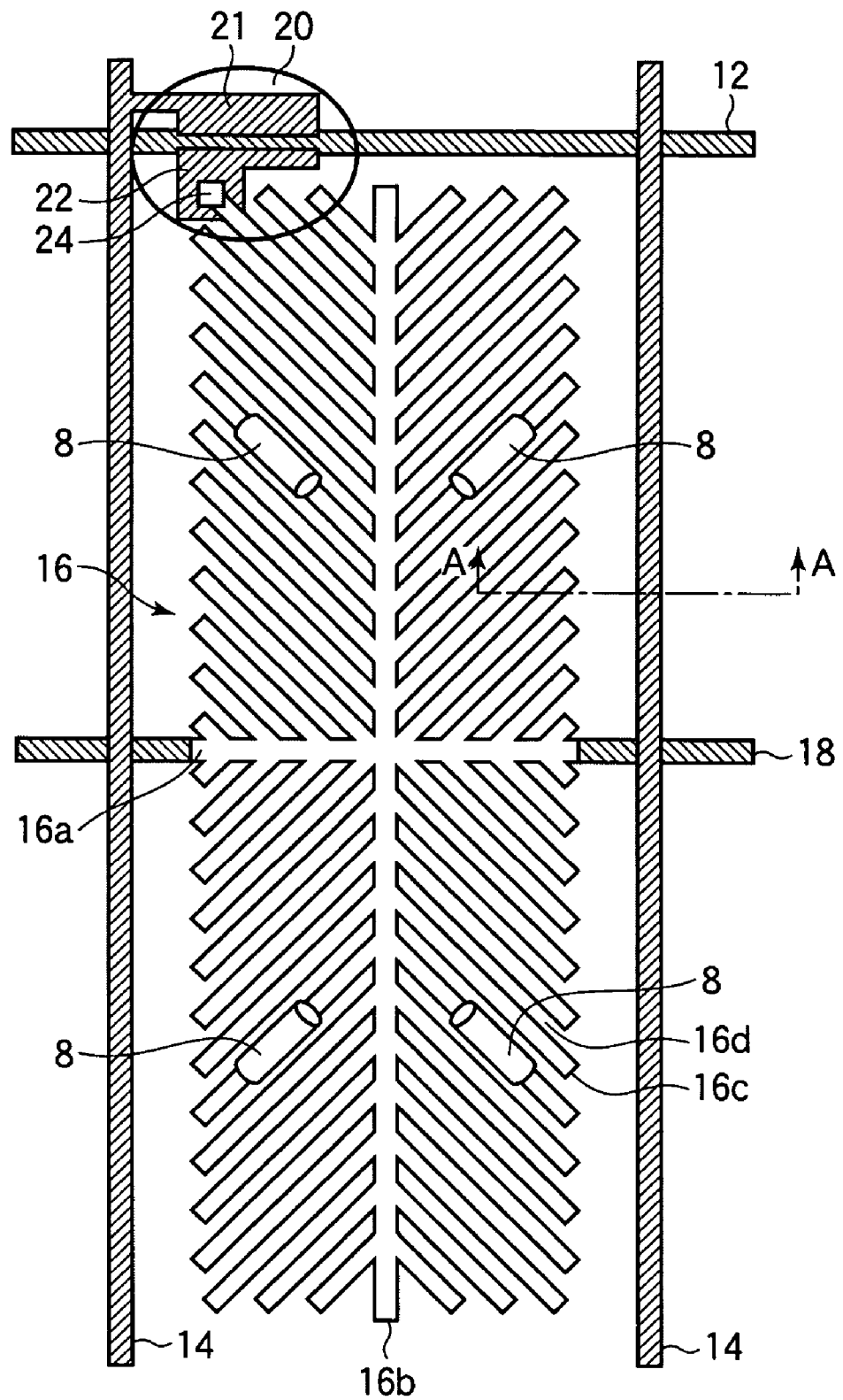
FIG. 2 shows a configuration of one pixel of the liquid crystal display in the mode for carrying out the invention.
Figure 3:
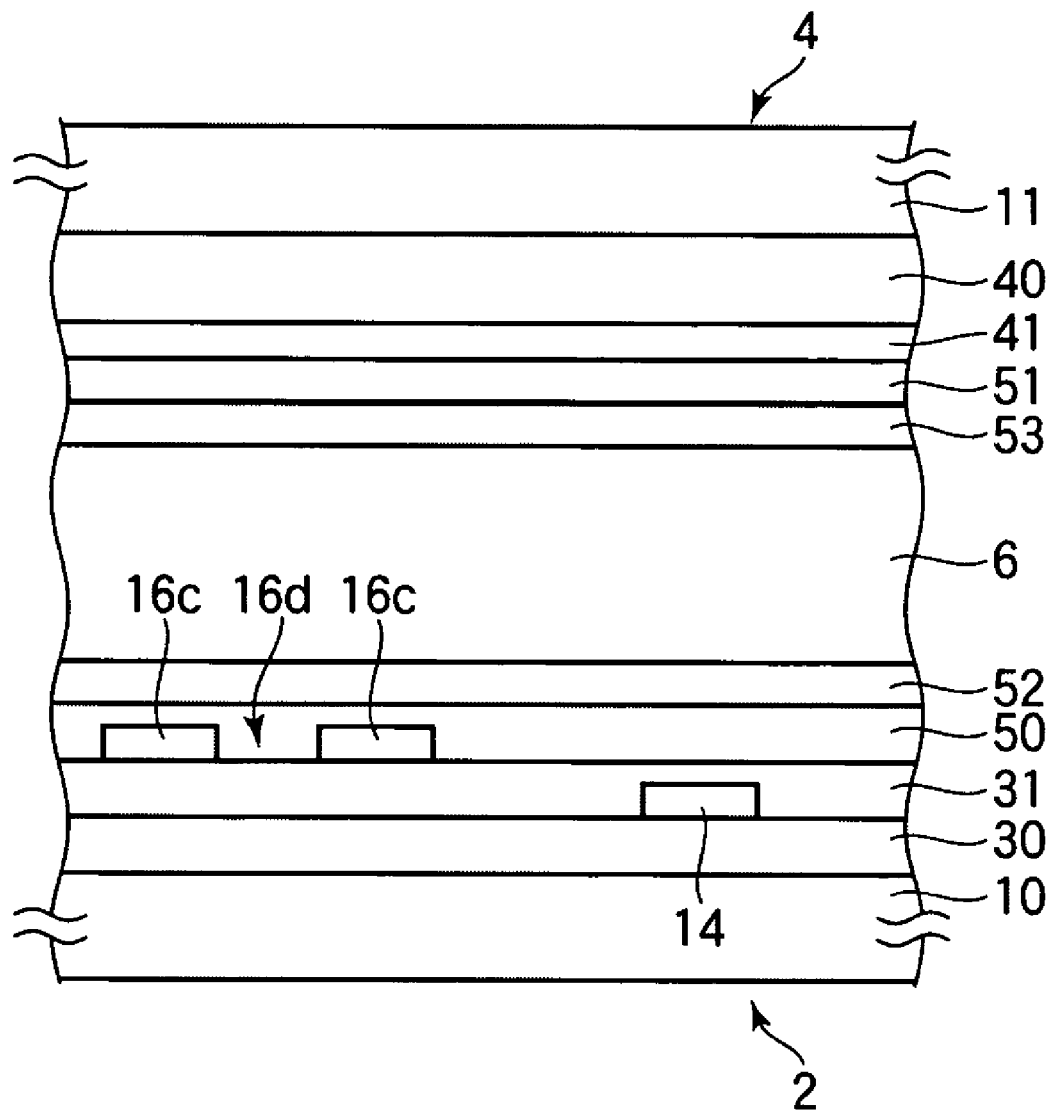
FIG. 3 is a sectional view showing the configuration of the liquid crystal display in the mode for carrying out the invention.

FIG. 2 shows a configuration of one pixel of the liquid crystal display in the present mode for carrying out the invention and FIG. 3 shows a sectional constitution of the liquid crystal display taken along a line A-A of FIG. 2. FIG. 2 also schematically shows directions of alignment of liquid crystal molecules 8. As shown in FIGS. 2 and 3, the TFT substrate 2 includes a plurality of gate bus lines 12 formed on a glass substrate 10 and a plurality of drain bus lines 14 formed to extend across the gate bus lines 12 with an insulation film 30 interposed between them. Storage capacitor bus lines 18 extending in parallel with the gate bus lines 12 are formed across pixel regions surrounded by the gate bus lines 12 and the drain bus lines 14. TFTs 20 are formed in the vicinity of intersections between the gate bus lines 12 and the drain bus lines 14, a TFT 20 being provided as a switching element at each pixel. A drain electrode 21 of a TFT 20 is electrically connected to a drain bus line 14, and a part of a gate bus line 12 serves as a gate electrode of a TFT 20. A protective film 31 is formed above the drain bus lines 14 and the TFTs 20 throughout the substrate.

A pixel electrode 16 constituted by a transparent conductive film such as an ITO is formed at each pixel region on the protective film 31. The pixel electrode 16 is electrically connected to a source electrode 22 of the TFT 20 associated therewith through a contact hole 24 which is an opening in the protective film 31. The pixel electrode 16 includes a linear electrode 16a extending substantially in parallel with the gate bus lines 12 and a linear electrode 16b intersecting with the linear electrode 16a in the form of a cross and extending substantially in parallel with the drain bus lines 14. The pixel electrode 16 also includes a plurality of linear electrodes 16c obliquely branching from the linear electrode 16a or 16b and extending in the form of stripes in four orthogonal directions in the single pixel and fine slits 16d formed between linear electrodes 16c which are adjacent to each other. An alignment film 50 is formed above the pixel electrodes 16 throughout the substrate to align liquid crystal molecules 8 substantially perpendicularly to the surface of the substrate. The alignment film 50 is formed using a material which includes an epoxy type cross linking agent at a concentration in the range from 0% by weight to 0.01% by weight inclusive. For example, a polymer layer 52 for regulating the direction of alignment of the liquid crystal molecules 8 is formed at the interface between the alignment film 50 and a liquid crystal 6.

The opposite substrate 4 includes CF resin layers 40 formed on a glass substrate 11. A CF resin layer 40 in any of red, green, and blue is formed at each pixel. A common electrode 41 constituted by a transparent conductive film is formed on the CF resin layers 40 throughout the substrate. An alignment film 51 for aligning the liquid crystal molecules 8 substantially perpendicularly to the substrate surface is formed on the CF resin layers 40 throughout the substrate 41. Similarly to the alignment film 50 on the TFT substrate 2, the alignment film 51 is formed using a material including an epoxy type cross linking agent at a concentration in the range from 0% by weight to 0.01% by weight inclusive. A polymer layer 53 similar to the polymer layer 52 on the TFT substrate 2 is formed at the interface between the alignment film 51 and the liquid crystal 6. For example, the polymer layers 52 and 53 are formed by optically or thermally polymerizing a polymeric component such as a monomer included in the liquid crystal 6 with a predetermined voltage applied to the liquid crystal 6. The polymer layers 52 and 53 keep the liquid crystal molecules 8 tilted at a predetermined pre-tilt angle to the substrate surfaces even after the applied voltage is removed. Thus, the tilting direction of the liquid crystal molecules 8 is regulated when the liquid crystal display panel is actually driven. As a result, since the liquid crystal molecules 8 are substantially uniformly tilted in the four orthogonal directions in one pixel when a voltage is applied, a liquid crystal display having a wide viewing angle can be provided.

In the present mode for carrying out the invention, high display quality can be achieved without display irregularities by forming the alignment films 50 and 51 using a material including an epoxy type cross linking agent at a concentration in the range from 0% by weight to 0.01% by weight inclusive. In the present mode for carrying out the invention, the electrical characteristics and water resisting property of the alignment films 50 and 51 are improved by setting the rate of imidization of the alignment films 50 and 51 at 50% or higher. The present mode for carrying out the invention is advantageous especially when applied to a liquid crystal display fabricated using the ODF method which is liable to visually perceivable display irregularities.

The liquid crystal display in the present mode for carrying out the invention will now be specifically described with reference to preferred embodiments of the same.

First Embodiment

A vertical alignment film material VA-PIa including a diamine a and an acid anhydride a and a vertical alignment film material VA-PIb including a diamine b and an acid anhydride b were prepared. Each of the two types of alignment film materials was divided into four portions. An epoxy type cross linking agent was mixed in three of each group of materials at three different concentrations (0.01% by weight, 0.1% by weight, and 0.2% by weight), respectively, and no epoxy type cross linking agent was mixed in the last one of each group (concentration of 0% by weight) to produce eight types of alignment film materials. After cleaning a TFT substrate 2 having pixel electrodes 16 as shown in FIG. 2 and an opposite substrate 4 having no alignment regulating structures such as protrusions and slits formed thereon, the eight types of alignment film materials were printed on each of the substrates 2 and 4. After pre-curing the alignment film materials at 70° C. to eliminate the solvent in the materials, the substrates 2 and 4 were heated at 200° C. for 10 minutes to cure the alignment film materials, whereby alignment films 50 and 51 were formed. Next, the substrates 2 and 4 were cleaned, and a seal material was continuously applied to the entire periphery of the TFT substrate 2. Subsequently, an n-type liquid crystal including an optically polymerizable monomer at a concentration of 0.3% by weight was dispensed to a plurality of locations in the region of the TFT substrate 2 surrounded by the seal material. Then, the TFT substrate 2 and the opposite substrate 4 were combined, and a heating process was performed at 120° C. for 60 minutes to cure the seal material. In the present embodiment, chamfering was performed after cutting the substrates into each panel because there was a need for applying a voltage to the liquid crystal layer to polymerize the monomer.

Next, a voltage of 17 V dc was applied between each drain bus line 14 and a common electrode 41 without applying a voltage to gate bus lines 12, and a voltage of 17 V dc was thus applied between each pixel electrode 16 and the common electrode 41. In this state, the liquid crystal 6 was irradiated with ultraviolet light for 100 seconds. The ultraviolet light was applied such that the panels would have uniform luminance on the entire surfaces thereof. Thus, the monomer included in the liquid crystal 6 was polymerized to form polymer layers 52 and 53 at interfaces between the liquid crystal 6 and the alignment films 50 and between the liquid crystal 6 and the alignment films 51, respectively. Thereafter, polarizers 86 and 87 were applied to the outer sides of the substrates 2 and 4 in a crossed Nicols relationship. Eight types of liquid crystal display panels different from each other in the material of the alignment films 50 and 51 were fabricated through the above-described steps.

The eight types of liquid crystal display panels were irradiated with light from behind, and display conditions were checked with attention paid primarily to the presence of display irregularities. Table 1 shows evaluations on display quality of the eight types of liquid crystal display panels. In Table 1, a circle indicates a liquid crystal display panel on which high display quality was achieved; a triangle indicates a liquid crystal display panel on which relatively high display quality was achieved; a cross indicates a liquid crystal display panel which had somewhat low display quality; and a pair of crosses indicates a liquid crystal display which had very low display quality. As shown in Table 1, the display quality of the liquid crystal display panels varies depending on the concentrations of the epoxy type cross linking agent rather than the seed monomers (diamines and acid anhydrides) in the alignment film materials. It was revealed that higher display quality can be achieved, the lower the concentration of the epoxy type cross linking agent in the alignment films 50 and 51 and that the concentration of the epoxy type cross linking agent must be in the range from 0% by weight to 0.01% by weight inclusive in order to achieve relatively high display quality. In particular, the liquid crystal display panels including the alignment films 50 and 51 with no epoxy type cross linking agent (concentration of 0% by weight) had no visually perceivable display irregularity and therefore had high display quality.

TABLE 1

| Epoxy Type Cross Linking | Alignment Film Material | |
| Agent Concentration | VA-PIa | VA-PIb |
| --- | --- | --- |
| 0% by weight | ○ | ○ |
| 0.01% by weight | Δ | Δ |
| 0.1% by weight | X | X |
| 0.2% by weight | XX | XX |

It was found from the above results that an MVA liquid crystal utilizing the PSA method can achieve high display quality without display irregularities when alignment films 50 and 51 thereof are formed using a material including an epoxy type cross linking agent at a concentration in the range from 0% by weight to 0.01% by weight inclusive.

Embodiment 2

Three types of vertical alignment film materials VA-PIc1, VA-PIc2, and VA-PIc3 including a diamine c and an acid anhydride and having different rates of imidization were prepared. The rates of imidization of the alignment film materials VA-PIc1, VA-PIc2, and VA-PIc3 were 0%, 50%, and 75%, respectively. The concentration of an epoxy type cross linking agent is 0% by weight in all of the alignment film materials VA-PIc1, VA-PIc2, and VA-PIc3. After cleaning a TFT substrate 2 having pixel electrodes 16 as shown in FIG. 2 and an opposite substrate 4 having no alignment regulating structures such as protrusions and slits formed thereon, the three types of alignment film materials were printed on each of the substrates 2 and 4. After pre-curing the alignment film materials at 70° C. to eliminate the solvent in the materials, the substrates 2 and 4 were heated at 200° C. for 10 minutes to cure the alignment film materials, whereby alignment films 50 and 51 were formed. As a result of thermal imidization at the step of curing the alignment films 50 and 51 by heat, the rate of imidization of the alignment film material VA-PIc1 became about 30%. On the contrary, it was revealed that the alignment film materials VA-PIc2 and VA-PIc3 were subjected to substantially no thermal imidization because they had been chemically imidized in advance and that there was substantially no difference between the rates of imidization of each of the alignment film materials VA-PIc2 and VA-PIc3 before and after the heat curing. Next, the substrates 2 and 4 were cleaned, and a seal material was continuously applied to the entire periphery of the TFT substrate 2. Subsequently, an n-type liquid crystal including an optically polymerizable monomer at a concentration of 0.3% by weight was dispensed to a plurality of locations in the region of the TFT substrate 2 surrounded by the seal material. Then, the TFT substrates 2 and the opposite substrates 4 were combined, and a heating process was performed at 120° C. for 60 minutes to cure the seal material. In the present embodiment, chamfering was performed after cutting the substrates into each panel because there was a need for applying a voltage to the liquid crystal layer to polymerize the monomer.

Next, a voltage of 17 V dc was applied between each drain bus line 14 and a common electrode 41 without applying a voltage to the gate bus lines 12, and a voltage of 17 V dc was thus applied between each pixel electrode 16 and the common electrode 41. In this state, the liquid crystal 6 was irradiated with ultraviolet light for 100 seconds. The ultraviolet light was applied such that the panels would have uniform luminance on the entire surfaces thereof. Thus, the monomer included in the liquid crystal 6 was polymerized to form polymer layers 52 and 53 at interfaces between the liquid crystal 6 and the alignment films 50 and between the liquid crystal 6 and the alignment films 51, respectively. Thereafter, polarizers 86 and 87 were applied to the outer sides of the substrates 2 and 4 in a crossed Nicols relationship. Three types of liquid crystal display panels having different rate of imidization each other in the material of the alignment films 50 and 51 were fabricated through the above-described steps.

The voltage holding capacities of the three types of liquid crystal display panels were measured. Table 2 shows evaluations on the voltage holding capacities of the three types of liquid crystal display panels. In Table 2, a circle indicates a liquid crystal display panel which achieved a relatively high voltage holding capacity, and a cross indicates a liquid crystal display panel which could not achieve a high voltage holding capacity. As shown in Table 2, a liquid crystal display panel having alignment films 50 and 51 at a rate of imidization of 50% or higher achieved a high voltage holding capacity. On the contrary, a high voltage holding capacity could not be achieved by a liquid crystal display panel having alignment films 50 and 51 which were formed using the material at a rate of imidization of 0% and whose rate of imidization increased to 30% after heat curing. A liquid crystal display panel having alignment films 50 and 51 formed using the material at a rate of imidization of 75% achieved a voltage holding capacity slightly higher than that of the liquid crystal display panel having the alignment films 50 and 51 at a rate of imidization of 50%. However, since the use of a material having a very high rate of imidization can result in an increase in the material cost, it is assumed that a preferable rate of imidization of the alignment films 50 and 51 is about 50%.

TABLE 2

| Rate of Imidization | Alignment Film Material VA-PIc |
|---|---|
| 0% by weight (30% after heat curing) | X |
| 50% | ○ |
| 75% | ○ |

The liquid crystal display panel including the alignment films 50 and 51 at a rate of imidization of 50% or higher was relatively good in electrical characteristics other than the voltage holding capacity, and it also had a relatively high water resisting property. All of the three types of liquid crystal display panels had relatively high display quality when they were irradiated with light from behind to check their display conditions with attention paid primarily to the presence of display irregularities.

The results shown above indicate that an MVA liquid crystal display utilizing the PSA technique can achieve high electrical characteristics and a relatively high water resisting property when alignment films 50 and 51 thereof have a rate of imidization of 50% or higher.

The invention is not limited to the above-described mode of carrying out the invention and may be modified in various ways.

For example, although a liquid crystal display fabricated using the ODF method has been referred to by way of example in the above-described mode for carrying out the invention, the invention is not limited to the same and may be applied to a liquid crystal display fabricated using the dip type vacuum filling method.

Although a transmissive liquid crystal display has been referred to by way of example in the above-described mode for carrying out the invention, the invention is not limited to the same and may be applied to other liquid crystal displays such as reflective or transflective displays.

Further, although a liquid crystal display having CF resin layers 40 formed on an opposite substrate 4 has been referred to by way of example in the above-described mode for carrying out the invention, the invention is not limited to the same and may be applied to a liquid crystal display having the so-called CF-on-TFT structure in which color filters are formed on a TFT substrate 2.

What is claimed is:

1. A liquid crystal display comprising:
a pair of substrates provided opposite to each other;
a liquid crystal having negative dielectric constant anisotropy sealed between the pair of substrates;
an alignment film formed on each of surfaces of the pair of substrates facing each other for vertically aligning the liquid crystal, the film being formed using a material comprising polyamic acid or polyimide including an epoxy inclusive cross linking agent at a concentration of no more than 0.01% by weight inclusive;

a polymer layer formed in the vicinity of the alignment film and sandwich between the alignment film and the liquid crystal; and a pixel electrode on at least one of the pair of substrates;

wherein the pixel electrode comprises a plurality of linear electrodes intersecting with each other and a plurality of stripe-shaped electrodes obliquely branching from at least one of the plurality of linear electrodes, and a fine slit between adjacent stripe-shaped electrodes.

2. A liquid crystal display according to claim 1, wherein the rate of imidization of the alignment film is 50% or higher.

3. A liquid crystal display according to claim 2, wherein the rate of imidization of the alignment film is about 50%.

4. A liquid crystal display according to claim 1, further comprising a seal material continuously formed at a peripheral part of the pair of substrates.

5. The liquid crystal display according to claim 1, wherein the polymer layer is substantially parallel to the alignment film.

6. The liquid crystal display of claim 1, wherein said slits cause at least liquid crystal molecules proximate said slits to align in directions of the slits.

* * * * *